United States Patent
Wai et al.

(10) Patent No.: US 7,433,597 B2
(45) Date of Patent: Oct. 7, 2008

(54) DEFLECTION ROUTING ADDRESS METHOD FOR ALL-OPTICAL PACKET-SWITCHED NETWORKS WITH ARBITRARY TOPOLOGIES

(75) Inventors: Ping-Kong Alex Wai, Hong Kong (HK); On-Kwok Victor Li, Hong Kong (HK); Chun-Yin Li, Hong Kong (HK); Xiaochun Yuan, Hong Kong (HK)

(73) Assignees: The Hong Kong Polytechnic University, Hong Kong (HK); Versitech Limited (CN)

( * ) Notice: Subject to any disclaimer, the term of this patent is extended or adjusted under 35 U.S.C. 154(b) by 862 days.

(21) Appl. No.: 10/424,829

(22) Filed: Apr. 28, 2003

(65) Prior Publication Data

US 2004/0213570 A1 Oct. 28, 2004

(51) Int. Cl.
*H04J 14/00* (2006.01)
(52) U.S. Cl. ............................. 398/45; 398/51; 398/54
(58) Field of Classification Search ............. 398/45–46, 398/49–51, 54, 58
See application file for complete search history.

(56) References Cited

U.S. PATENT DOCUMENTS

| 6,647,428 B1* | 11/2003 | Bannai et al. ............... 709/245 |
| 6,934,472 B2* | 8/2005 | Chang et al. .................. 398/51 |
| 2003/0031177 A1* | 2/2003 | Robidas et al. ............. 370/392 |
| 2003/0061376 A1* | 3/2003 | Li et al. ....................... 709/238 |
| 2003/0152182 A1* | 8/2003 | Pai et al. ...................... 375/372 |
| 2003/0161632 A1* | 8/2003 | Wang ............................ 398/48 |
| 2006/0153066 A1* | 7/2006 | Saleh et al. .................. 370/216 |

OTHER PUBLICATIONS

Acampora A. S. and Shah S. I. A., "Multihop lightwave networks: A comparison of store-and-forward and hot-potato routing," IEEE Transactions on Communications, vol. 40, No. 6, pp. 1082-1090 (1992).

D.J. Blumenthal, et al., "Photonic packet switches: architectures and experimental implementations," Proceedings of The IEEE, vol. 82, No. 11, pp. 1650-1667, (1994).

Chan V. W. S. et al., "Architectures and technologies for high-speed optical data networks," Journal of Lightwave Technology, vol. 16, No. 12, pp. 2146-2168 (1998).

(Continued)

*Primary Examiner*—Dzung D Tran
(74) *Attorney, Agent, or Firm*—Dickstein, Shapiro, LLP.

(57) ABSTRACT

A method of deflection routing a packet in an all-optical communication network is described. Routing and destination information is contained in the address header of the packet and is generated by the originating node while still in the electrical domain before conversion to the optical domain. Receiving nodes process the address header in the optical domain using the information for their node from the address header. The address header is comprised of N node fields where N is the number of nodes on the optical network. Each node field contains routing information for a node on the optical network. Each node field contains at least one port field containing routing and address information associated with a port in the node.

14 Claims, 10 Drawing Sheets

OTHER PUBLICATIONS

P. Toliver, et al., "Routing of 100 Gb/s words in a packet-switched optical networking demonstration (POND) mode," *J. Lightwave Technology*, vol. 16, No. 12, pp. 2169-2180, 1998.

C. Qiao and Yoo M., "Optical burst switching (OBS)—a new paradigm for an optical Internet," Journal of High Speed Networks, vol. 8, pp. 69-84 (1999).

Renaud M. et al., "Transparent optical packet switching: The European ACTS KEOPS project approach," Proceedings of LEOS 99, vol. 2, pp. 401-402 (1999).

Yuan X. C., et al, "A novel self-routing scheme for all-optical packet switched networks with arbitrary topology," Proceedings of ICC 2001, vol. 7, pp. 2155-2159 (2001).

* cited by examiner

7b

| Destination Node | Source Node | | | | |
|---|---|---|---|---|---|
| | 1 | 2 | 3 | 4 | 5 |
| 1 | - - | 1 7 | 2 8 12 | 4 6 13 | 7 10 |
| 2 | 1 5 | - - | 3 7 14 | 3 7 14 | 8 9 |
| 3 | 4 2 | 3 7 | - - - | 6 4 11 | 5 10 |
| 4 | 4 6 | 5 3 | 6 4 11 | - - - | 9 6 |
| 5 | 9 7 | 8 9 | 9 10 5 | 11 9 6 | - - |

7c

| Destination Node | Source Node | | | | |
|---|---|---|---|---|---|
| | 1 | 2 | 3 | 4 | 5 |
| 1 | 0 0 | 1 2 | 1 2 3 | 1 2 3 | 1 2 |
| 2 | 1 2 | 0 0 | 1 2 3 | 1 2 3 | 1 2 |
| 3 | 2 1 | 1 2 | 0 0 0 | 2 1 3 | 1 2 |
| 4 | 1 2 | 2 1 | 2 1 3 | 0 0 0 | 2 1 |
| 5 | 2 1 | 1 2 | 2 3 1 | 3 2 1 | 0 0 |

7d

| Node | Address | | | | |
|---|---|---|---|---|---|
| 1 | 00:00 | 10:01 | 100:010:001 | 100:010:001 | 10:01 |
| 2 | 10:01 | 00:00 | 100:010:001 | 100:010:001 | 10:01 |
| 3 | 01:10 | 10:01 | 000:000:000 | 010:100:001 | 10:01 |
| 4 | 10:01 | 01:10 | 010:100:001 | 000:000:000 | 01:10 |
| 5 | 01:10 | 10:01 | 010:001:100 | 001:020:100 | 00:00 |

752       754

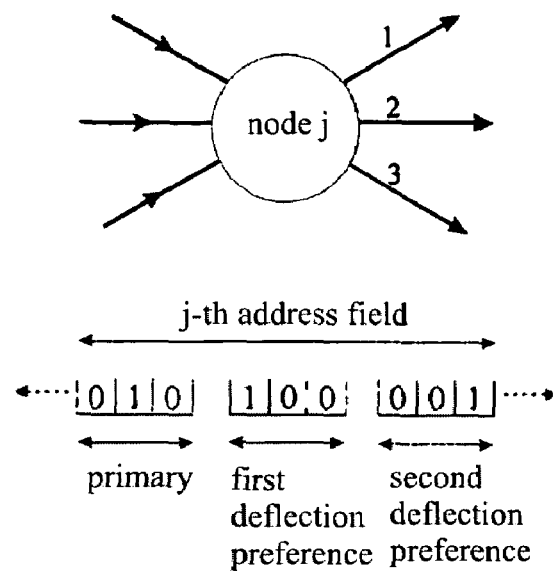
Fig. 8. An example of the address field of a 3 x 3 node with full deflection preference fields added.
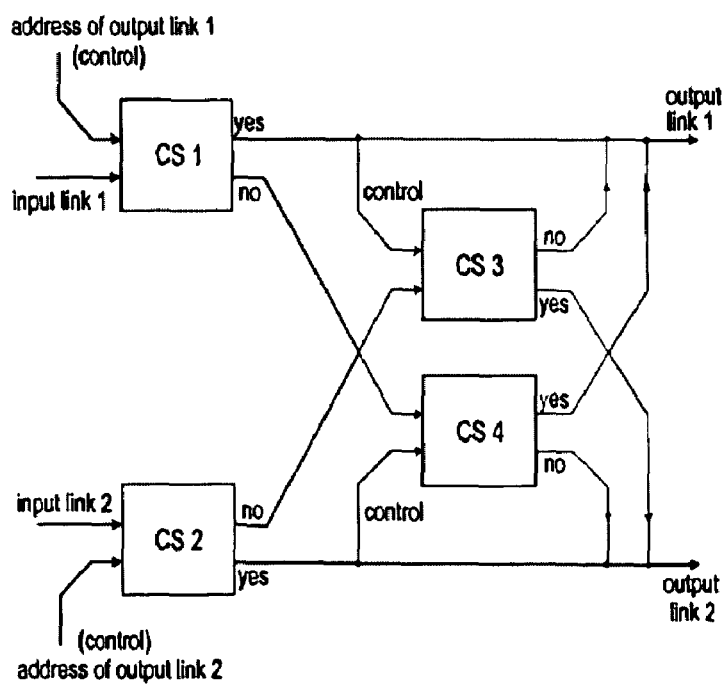
Fig. 9. A schematic of an all-optical 2x2 deflection routing node

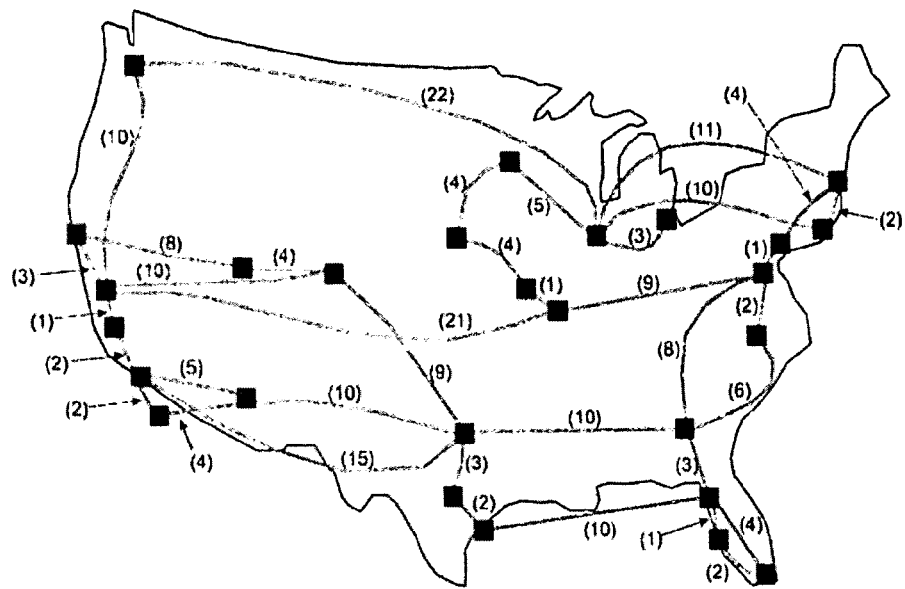

Fig. 10. The AT&T North America OC-48 fiber network obtained in March 2001 from the URL http://www.ipservices.att.com/backbone/bbone-map.cfm.

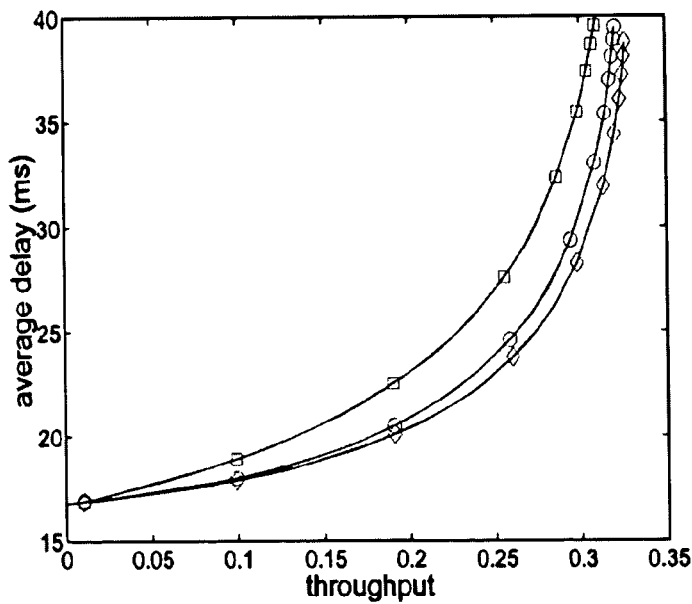

Fig. 11. Delay throughput curves. The squares represent simulation results when there is no deflection preference. The circles and the diamonds represent the cases when there is single deflection preference and full deflection preferences, respectively

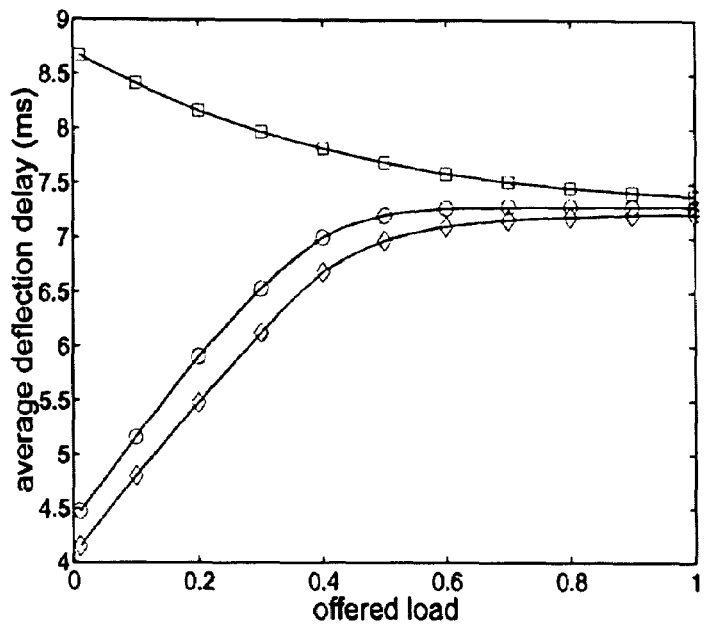

Fig. 12. The average delay due to deflection versus offered load for the network shown in Fig. 10. The notations are similar to that of Fig. 11.

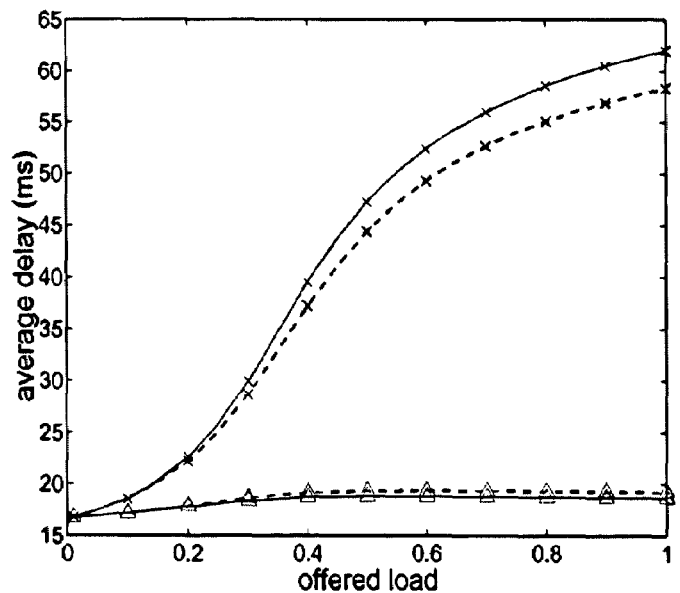

Fig. 13. Average delay versus the total offered load of the strong and the weak priority schemes. Solid lines represent strong priority scheme while dashed lines represent weak priority scheme. There are two priority classes. The ratio of their offered load is 1:1. Crosses correspond to the low priority packets while triangles correspond to higher priority packets.

DEFLECTION ROUTING ADDRESS METHOD FOR ALL-OPTICAL PACKET-SWITCHED NETWORKS WITH ARBITRARY TOPOLOGIES

FIELD OF THE INVENTION

The present invention relates to optical communication/data networks. More specifically, the invention relates to methods for assigning addresses to nodes in deflection-routed packet-switched optical networks.

BACKGROUND OF THE INVENTION

The current rapid growth in traffic demand in communication networks is expected to continue in the next few years. High capacity networks capable of efficiently handling voice, video, and data are necessary to satisfy the growing demand. The high bandwidth capacity of optical communication networks make such networks the most promising candidates to satisfy the expected demand.

The existing optical networks usually employ circuit switching technology, and are not suitable for data applications involving bursty traffic. The current approach to implement packet-switching technology in optical networks is to keep the data in the optical domain and convert the control signal to the electrical domain for signal processing. C. Qiao and Yoo M., "Optical burst switching (OBS)—a new paradigm for an optical Internet," Journal of High Speed Networks, vol. 8, pp. 69-84 (1999), and Renaud M. et al., "Transparent optical packet switching: The European ACTS KEOPS project approach," Proceedings of LEOS 99, vol. 2, pp. 401-402 (1999) describe examples of the two domain, or hybrid, approach and are herein incorporated by reference.

The hybrid approach is adequate for the present demand for high speed packet-switched networks and combines the flexibility of electronics and the huge transmission bandwidth of optics. The packet switching rate, however, is limited by the comparatively low bandwidth of electronic devices and as the transmission rate increases, the header processing overheads become significant.

All-optical packet-switched networks, hereinafter referred to as optical networks, keep both the data and control signals in the optical domain from the source node to the destination node. The optical domain is typically characterized by carrier frequencies greater than about 100 THz. Chan V. W. S. et al., "Architectures and technologies for high-speed optical data networks," Journal of Lightwave Technology, vol. 16, no. 12, pp. 2146-2168 (1998) describes an example of an all-optical network and is herein incorporated by reference.

Optical networks, however, are presently limited by the lack of efficient buffers and relatively limited optical processing capabilities. The inventors describe in Yuan X. C., et al, "A novel self-routing scheme for all-optical packet switched networks with arbitrary topology," Proceedings of ICC 2001, vol. 7, pp. 2155-2159 (2001), herein incorporated by reference, one method of bypassing the optical processing limitation of optical networks. In this method, the required signal processing in the node is significantly reduced by a self-routing scheme that can be implemented using bitwise optical logic gates only.

In packet-switched networks, a conflict arises when two or more packets request the same output link in a node. In store-and-forward routing, the node stores the conflicting packets temporarily in buffers so that all packets are optimally routed over the shortest path. Unlike electronic buffers, optical buffers are limited and inefficient. Optical buffers are usually made from fiber delay lines, which are bulky and have a fixed delay. Furthermore, optical logic devices are presently limited to simple Boolean logic functions such as AND, OR, NOR, INVERT, and XOR operations that are difficult to integrate thereby making complex optical logic circuits, required for store-and forward routing, prohibitively expensive.

Deflection routing allows one to avoid or reduce the use of buffers by intentionally routing the packets that lose in a conflict to the 'wrong' output ports. The misrouted packets will find their way to their destination nodes but their arrival will be delayed. Deflection routing, in effect, uses the network links as the temporary storage for the packets. Acampora A. S. and Shah S. I. A., "Multihop lightwave networks: A comparison of store-and-forward and hot-potato routing," IEEE Transactions on Communications, vol. 40, no. 6, pp. 1082-1090 (1992), herein incorporated by reference, describes and compares store-and-forward routing to one method of deflection routing that bypasses the optical buffer limitation of optical networks. Deflection routing as described by Acampora and Shah, however, are not suitable for all-optical packet-switched networks because of the high demand of processing power at intermediate nodes.

In traditional deflection routing, a node determines the optimal paths from itself to the destination node. Packets requesting the same output port in a node are prioritized according to a deflection criterion, for example age or distance-to-destination. The packet with the higher priority is routed optimally to the shortest path while the conflicted packet having a lower priority is deflected to a link having a longer path length. In traditional deflection routing, a node must have the capability to determine the optimal paths of arriving packets and compare the deflection criteria of conflicting packets. The required optical processing capability required of each intermediate node is both complex and prohibitively expensive, making the implementation of such a deflection routing method uneconomic.

Therefore, there remains a need for providing a method for deflection routing that does not require large optical processing capabilities at the intermediate nodes.

SUMMARY

The present invention reduces the required computation of a node for determining the optimal path and deflection criteria of a packet by storing the required information in the packet header. The packet header is comprised of N subfields where N is the number of nodes on the optical network. Each subfield contains routing information for a node on the optical network. Each subfield contains sub-sub-fields containing routing and address information for each port in the node.

One embodiment of the present invention is directed to a method of routing a packet in an all-optical communications network, the network comprising at least one node, the node having at least two output ports, each port linking the node to another node in the network, the method comprising: receiving the packet at a receiving node, the packet having an address header comprising at least one node field corresponding to the receiving node, the node field having a primary port field corresponding to one of the at least two output ports of the node and a first deflection port field corresponding to another of the at least two output ports of the node; reading the node field corresponding to the receiving node; routing the packet through the output port designated by the primary port field, if the output port is available; and routing the packet through the output port designated by the first deflection port field if the output port designated by the primary port field is unavailable.

Another embodiment of the present invention is directed to an optical network node comprising: a first output port; at least one secondary output port; means for reading an address header of an incoming packet, the address header comprising a node field associated with the optical network node, the node field comprising a primary port field and a first deflection port field; means for forwarding the packet to the first output port if the primary port field designates the first output port; and means for forwarding the packet to the at least one secondary output port if the first deflection port field designates the at least one secondary output port and if the first output port designated by the primary output port is unavailable.

Another embodiment of the present invention is directed to a computer data signal embodied in an optical carrier wave comprising: a data segment; and an address header segment comprising at least one node field, the at least one node field comprising: a primary port field comprising a plurality of bits having a set state and an unset state, the primary port field representing an output port of a node or an instruction to accept the packet depending on the set state of the plurality of bits of the primary port field; and a first deflection port field comprising a plurality of bits having a set state and an unset state, the first deflection port field representing an output port other than the output port represented by the primary port field.

BRIEF DESCRIPTION OF THE DRAWINGS

The invention will be described by reference to the preferred and alternative embodiments thereof in conjunction with the drawings in which:

FIG. 7b is a table showing the routing costs between each node shown in FIG. 7a;

FIG. 7c is a table showing the output port weights for each node shown in FIG. 7a according to one embodiment of the present invention;

FIG. 7d is a table showing the address header for each node shown in FIG. 7a according to one embodiment of the present invention;

FIG. 8 is an example of the address field of a 3×3 node with full deflection preference fields added;

FIG. 9 is a schematic of an all-optical 2×2 deflection routing node;

FIG. 10 is a diagram of the AT&T North America OC-48 fiber network obtained from the URL http://www.ipservices.att.com/backbone/bbone-map.cfm in March 2001;

FIG. 11 is a diagram illustrating delay throughput curves;

FIG. 12 is a diagram illustrating the average delay due to deflection versus offered load for the network shown in FIG. 10; and FIG. 13 is a diagram illustrating the average delay versus the total offered load of the strong and the weak priority schemes.

DETAILED DESCRIPTION

Figure 1:
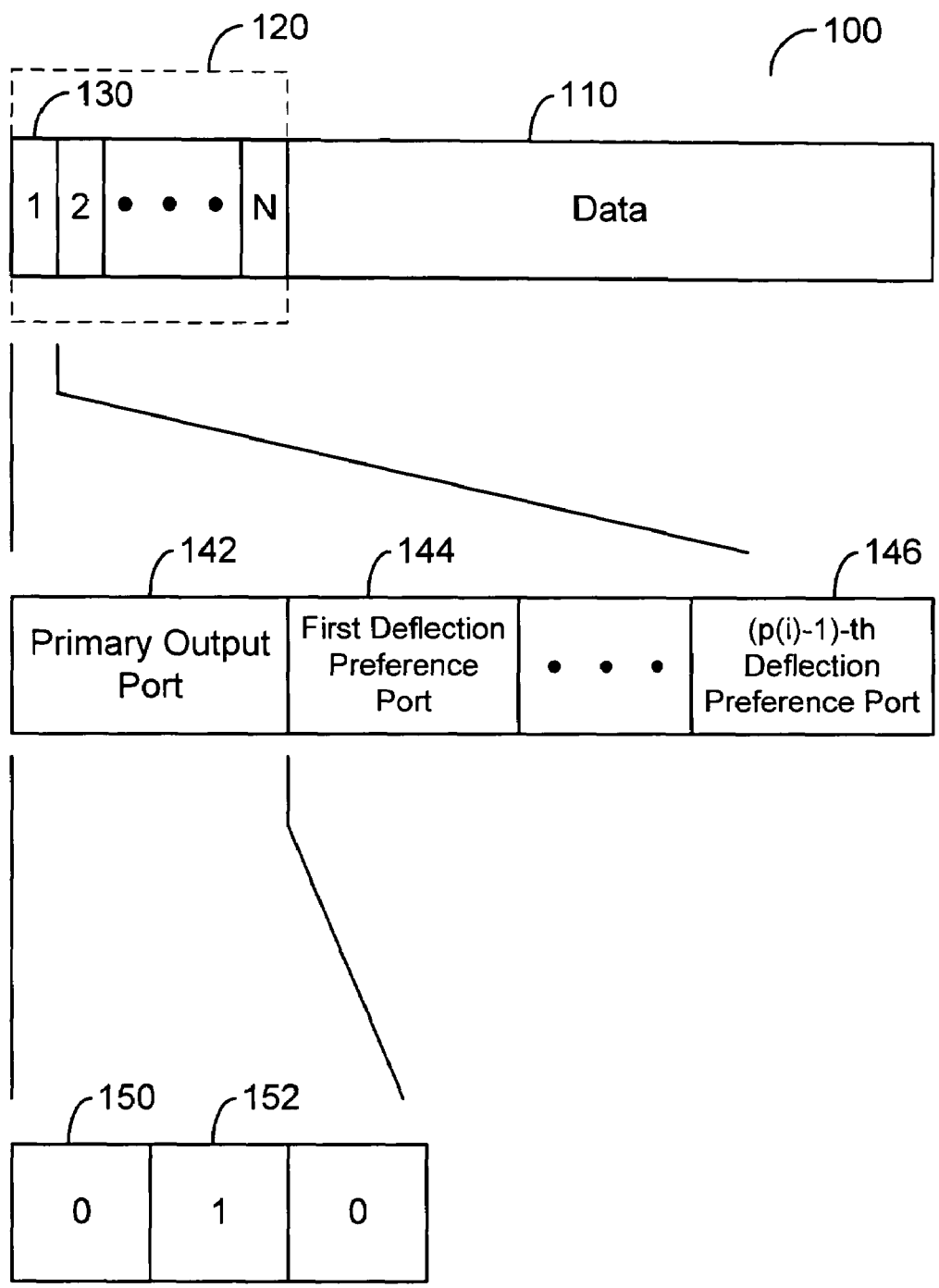
FIG. 1 is a schematic showing the address header structure in one embodiment of the present invention.

FIG. 1 is a schematic showing the address header structure in one embodiment of the present invention. Data packet 100 includes a data portion 110 and an address header 120. Address header 120 includes N sub-fields where N is the number of nodes in the optical network. Each sub-field 130, also referred to as the node field, further includes up to $d(i)$ sub-sub-fields where $d(i)$ is the number of output ports for node i. Each sub-sub-field, hereinafter referred to as the port field, identifies one of the node's output ports. The first port field is the primary port field 142. The second port field is the first deflection preference port 144 and so on until the $(d(i)-1)$-th deflection preference port 146. In one embodiment, each port field includes up to $d(i)$ bits where each bit corresponds to one of the node's output port. Each bit in the port field is either a set bit 152 or an unset bit 150. A specific output port is selected by setting the corresponding bit in the port field. In a preferred embodiment, the port field is $d(i)$ bits having at most one of the $d(i)$ bits set. A port field having none of its $d(i)$ bits set indicates that the node is the destination node of the packet.

As an illustrative example, if node 2 in an optical network has three output ports, each port field for node 2 would be $d(2)=3$ bits. The first port for node 2 is designated in the port field by setting the first bit, the second port for node 2 is designated by setting the second bit in the port field, and the third port for node 2 is designated by setting the third bit in the port field. It should be understood that setting a bit includes any and all means of placing the set bit into a state that is distinct from an unset bit. As an illustrative example, if the unset bits are given a value of 1, setting a bit may include assigning a value of 0 to the set bit. Conversely, if unset bits have a value of 0, setting a bit may include assigning a value of 1, or any non-zero value if more than one bit is used per port, to the set bit.

Each node field 130 may include up to $d(i)$ port fields. The first port field in the node field is termed the primary port 142. The second port field in the node field is called the first deflection preference 144, the third port field in the node field is called the second deflection preference, and so on until the $(d(i)-1)$-th deflection preference 146. The number of port fields in a node field is designated by $p(i)$ where $p(i) \leq d(i)$. In most situations, $p(i)=d(i)$, but $p(i)$ may be set to less than $d(i)$ when, for example, one of the links from the node is a very slow or unreliable link that is not normally used.

Figure 2:
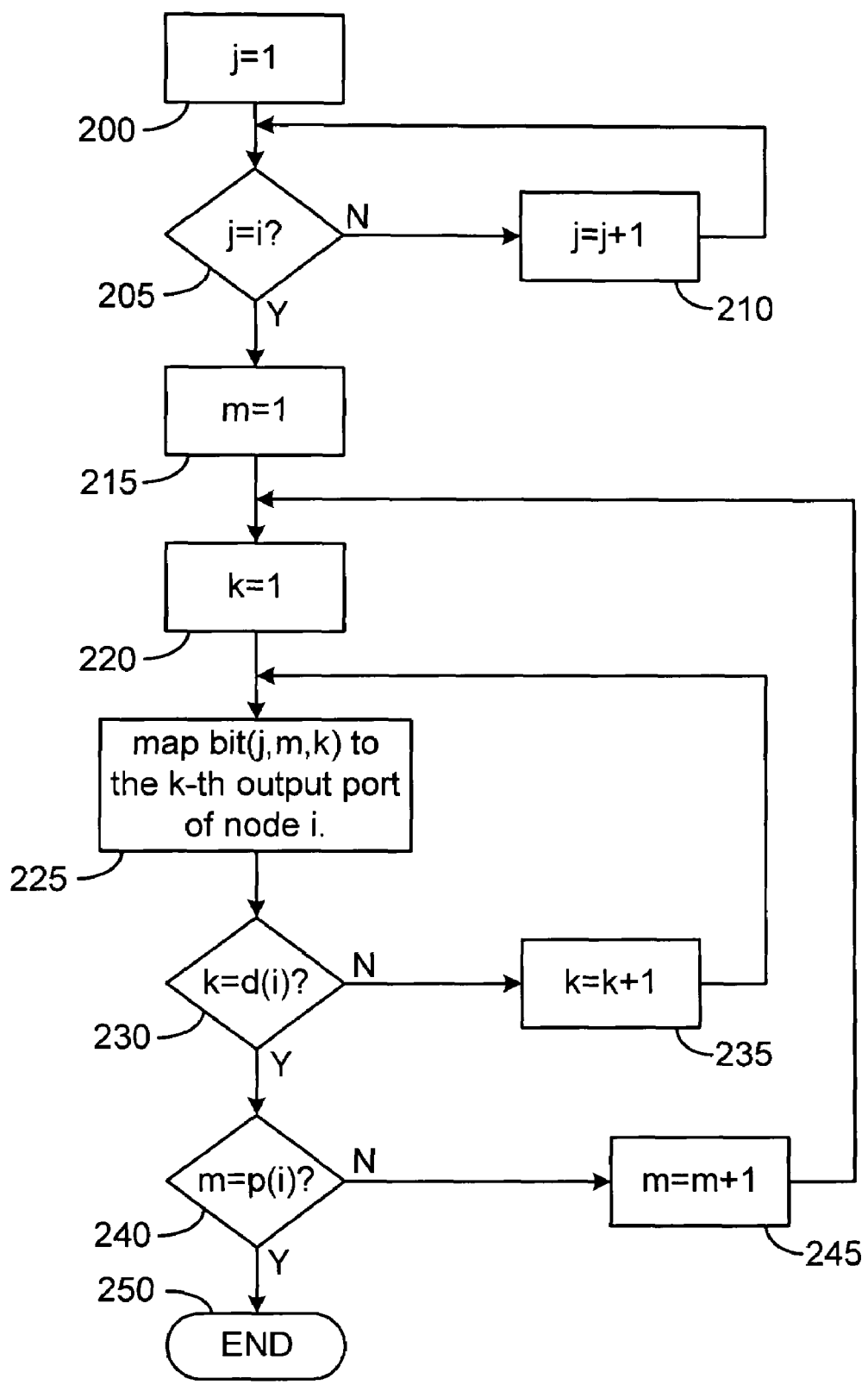
FIG. 2 is a block diagram of a method for associating each output port to a bit position in the node field of the address header.

FIG. 2 is a block diagram of a method for associating each output port of a node to a bit position in the node field of the address header. Each node performs the method of FIG. 2 to map its own node output ports. As used hereinafter, bit(j,m,k) represents the value of the k-th bit in the m-th port field of the j-th node field. Port index k runs from 1 to $d(j)$ where $d(j)$ is the number of output ports in node j. In one embodiment, port field index m runs from 1 to $d(j)$. Node index j runs from 1 to N, where N is the number of nodes in the optical network. For purposes of illustration, the node executing the method is indicated by the node index i. The notation p(i) is the number of port fields used in the node i address.

Referring to FIG. 2, the node index j is initialized in step 200. In step 205, if the node index is not the node's index, represented by node index value i, the node index is incremented in 210 before returning to 205. If the node index is equal to the node's index, port field index is initialized in 215, and port index k is initialized in 220. In step 225, the (j, m, k) bit of the address header is mapped to the k-th port of node i. The port index k is compared to d(i) in 230 and if the port index is not equal to d(i), the port index is incremented in 235 before returning to 225. The port field index, m, is compared to p(i) in 240 and if it is not equal to p(i), m is incremented in 245 before branching to 220. If the port field index is equal to p(i), the port mapping for node i is complete and the process terminates in 250.

In a preferred embodiment, the port mapping of FIG. 2 is performed once by each node in the optical network during system initialization. At each node, i, the node hardware is configured to attempt to route a packet to the k-th output port when bit(i,m,k) is set. The details of the node hardware configuration is known to one of skill in the art and is not discussed further. For example, D. J. Blumenthal, et al., "Photonic packet switches: architectures and experimental implementations," Proceedings of The IEEE, Vol. 82, No. 11, pp. 1650-1667, (1994) provides a description of optical network hardware configuration and mapping and is herein incorporated by reference. It should be understood that the node routing hardware may be configured electronically and once configured, the packet routing may be all-optical.

Figure 3:
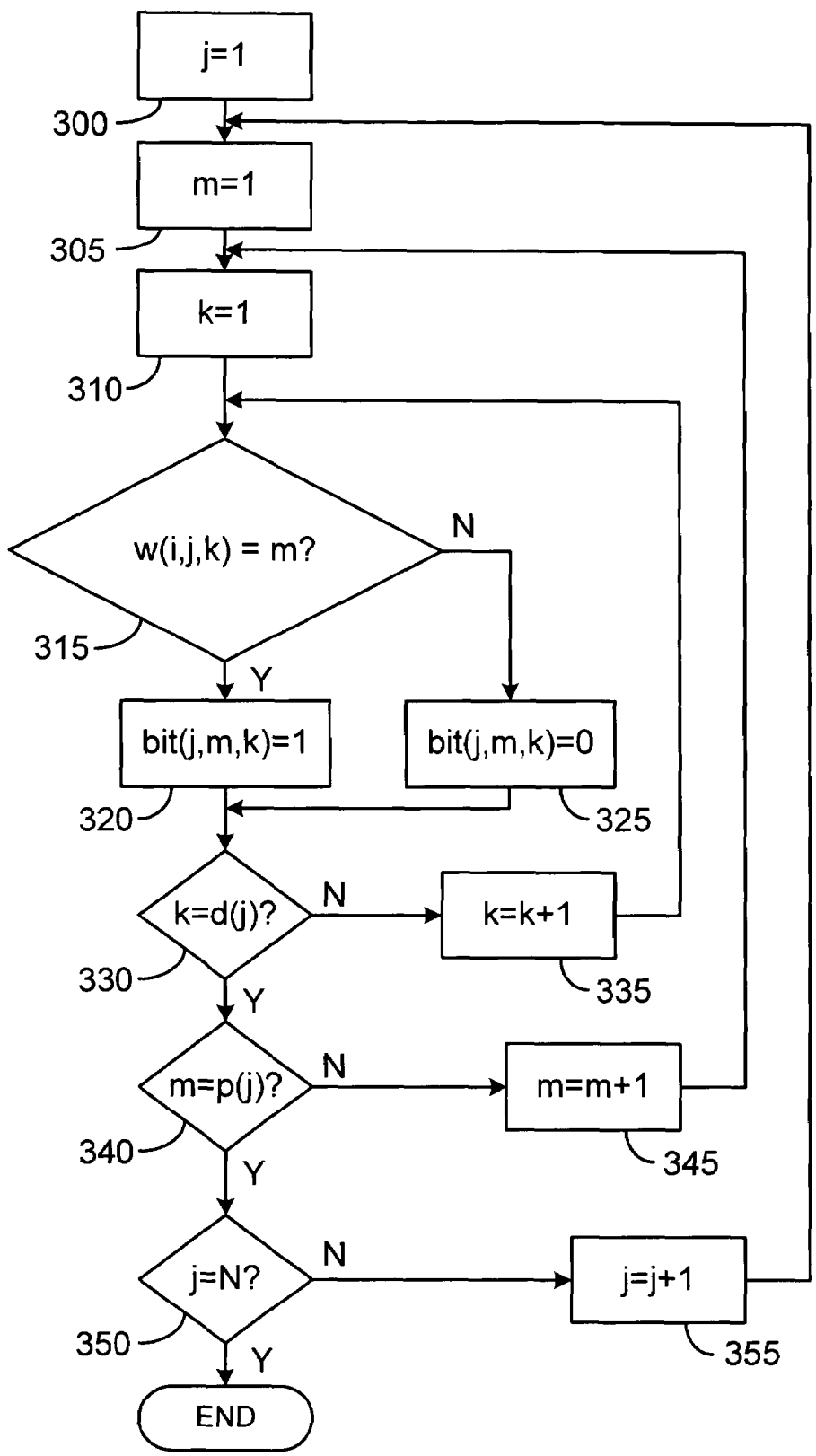
FIG. 3 is a block diagram of a method of generating a deflection routing address.

FIG. 3 is a block diagram of a method of generating a deflection routing address. In one embodiment, the method of FIG. 3 is implemented using the relatively slower, relative to optically devices, electrical based devices, as known to one of skill in the art. The address header is generated based on the destination node and a set of port weights associated with each node in the network.

A port weight, w(i,j,k), is assigned to each port in the node based on a cost function to the destination node. At each node j, each port is assigned a weight from 1 to d(j) that is different from the other port weights for that node. In a preferred embodiment, the port with the minimum cost function is assigned a weight of 1. The port with the next minimum cost function is assigned a weight of 2 and so on until the port with the highest cost function is assigned a weight of d(j). If two or more ports have the same cost function to the destination node, the weight value is assigned to one of the ports selected at random. For the destination node, indicated by the node index i, the port weights for all the ports are set to 0.

Port weights are assigned according to a cost function such as, for example, the shortest path length, most reliable path, or shortest path delay. Other cost functions may be apparent to one of skill in the art and are also intended to be within the scope of the present invention. The N sets of weights may be determined and assigned during system initialization and may remain unchanged during operation unless the network topology changes due to a node or link failure, for example.

Referring to FIG. 3, the node index j is initialized to 1 in step 300, the weight index, m, is initialized to 1 in step 305, and the port index, k, is initialized to 1 in step 310. The weight of the k-th port of the j-th node for destination node i, w(i,j,k), is compared to the weight index in step 315. If w(i,j,k) is equal to the weight index, bit(j,m,k) is assigned a logical value of 1 (bit set) in 320. If the k-th port's weight is not equal to the weight index, bit(j,m,k) is assigned a logical value of 0 (bit unset) in 325. After assigning bit(j,m,k), the port index is compared to the number of ports for node j in 330. If the port index is not equal to d(j), the port index is incremented in 335 before returning to 315. If the port index is equal to d(j), the weight index is compared to the number of port fields for node j, p(j), in step 340. If the weight index is not equal to p(j), the weight index is incremented in 345 before returning to 310. If the weight index is equal to p(j), the node index, j, is compared to N, the number of nodes in the network in step 350. If the node index is not equal to N, the node index is incremented in 355 before returning to 305. If the node index is equal to N, the address header is complete and the process is terminated.

Figure 4:
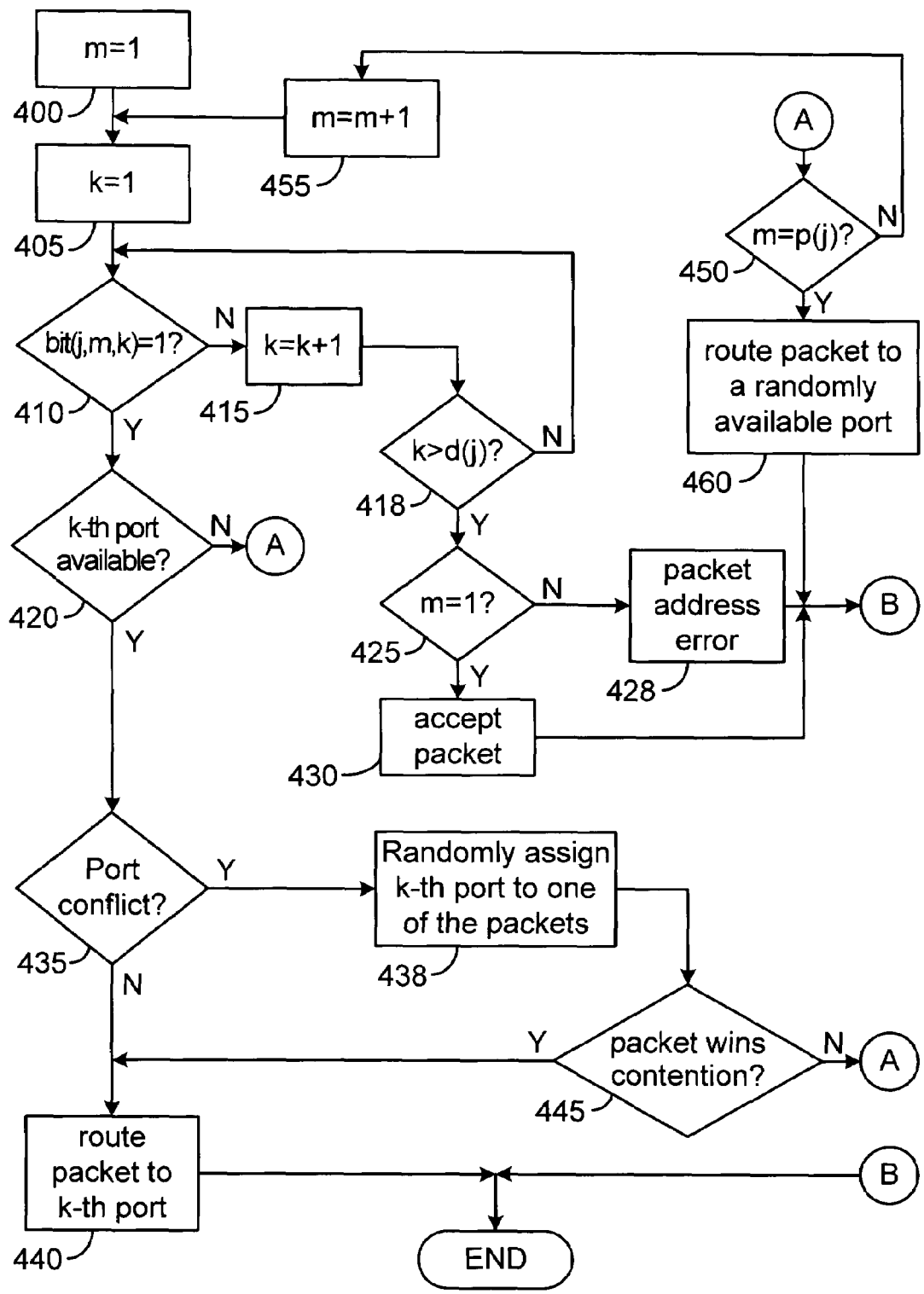
FIG. 4 is a block diagram of a method for routing a packet at a node according to one embodiment of the present invention.

FIG. 4 is a block diagram of a method for routing a packet at a node according to one embodiment of the present invention. In a preferred embodiment, the method may be implemented in bitwise optical logic gates. Examples of such bitwise optical logic gates are described in P. Toliver, et al., "Routing of 100 Gb/s words in a packet-switched optical networking demonstration (POND) mode," *J. Lightwave Technology*, Vol. 16, No. 12, pp. 2169-2180, 1998 and is herein incorporated by reference.

The originating node generates the address header for the packet based on the destination node and the cost function associated for each possible path from the originating node to the destination node. The address headers for each destination node in the network may be stored locally at each originating node. The stored address headers may be retrieved from local storage and attached to data originating at the originating node and destined for the destination node indicated in the attached header. The address headers for all the nodes in the network may be generated by one or more nodes on the network during system initialization or network topology change and the generated address headers distributed to the remaining nodes on the network during system initialization or network topology change.

An intermediate node receives a packet and directs the packet to one of its output ports according to the address header of the packet. The destination node receives a packet and accepts the packet according to the address header of the packet. The processing intensive operation of ranking possible paths and generating the address header is done in the node before the packet enters the optical domain thereby allowing electronic implementation of the header generator. All routing and destination information is contained in the address header such that the intermediate and destination nodes can process the address header in the optical domain using bitwise logic gates.

Each node receiving a packet forwards or accepts the packet according to the information contained in the node field for the receiving node. The receiving node attempts to route the packet through the output port designated in the primary port field of the receiving node's node field. If the primary port field does not contain a set bit, the receiving node is the destination node and the packet is accepted by the receiving node. If the output port designated in the primary port field is available, the packet is forwarded through the output port. If the output port designated in the primary port is not available, the node attempts to forward the packet through the output port designated in the first deflection preference port field. If the first deflection preference port is not available, the node attempts to forward the packet through the port designated in the next deflection preference port field and so on until the (p(i)-1)-th deflection port.

When two incoming packets have the same output port preference, a conflict situation is created. The node will randomly choose one of the conflicted packets and forward the randomly chosen packet through the requested output port. If another output port is available, the node will forward the other packet through the available port.

Referring to FIG. 4, the port field index variable, m, is initialized to 1 in 400 and the port index variable, k, is initialized to 1 in 405. Bit(j,m,k) of the incoming packet header is compared to 1 in 410, where j is the node receiving the incoming packet. If bit(j,m,k) is equal to 1, the node checks the availability of the k-th port in 420. If the k-th port is available, the node determines if there is a conflict in 435 and routes the packet to the k-th port if there is no conflict in step 440. If more than one packet requests the k-th port, a conflict is generated in 435 and the node assigns one of the competing packets to the k-th port in 438. The packet that wins the contention in 445 is routed to the k-th port. For the packet that loses the contention in 445, the port field index variable is compared to p(j) in 450. If the port field index variable is equal to p(j), the losing packet is routed to a randomly available port in 460 when p(j)<d(j). If the port field index variable is not equal to p(j), the port field index variable is incremented in 455 before returning to 405.

If bit(j,m,k) is not equal to a logical 1 in 410, the port index, k, is incremented in 415 and compared to d(j) in 418. If the port index is less than or equal to d(j), control is transferred to 410. If the port index is greater than d(j) in 418, the node determines if the port field is the primary port field in 425. If the port field is not the primary port field, the node determines that a packet address error has occurred in 428 and exits from the process. If the port field index is the primary port field 425, then all of the bits of the first port field is unset, indicating that node j is the destination node of the incoming packet and the node accepts the packet in 430 before exiting the process.

In some embodiments, priority routing may be incorporated into the packet address header and used by the intermediate nodes to resolve packet conflicts as now described. Priority routing is important in multimedia networks that mix delay-sensitive traffic and delay-insensitive traffic. In some embodiments, a priority field containing one or more priority bits is added to the address header. Intermediate nodes check the priority bit or bits and favors forwarding packets with the set priority bits over packets with unset priority bits.

Figure 5A:
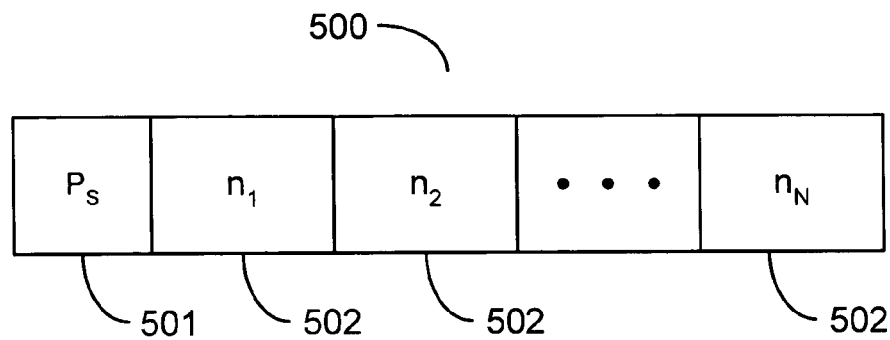
FIG. 5a is a schematic showing the sub-header structure in another embodiment of the present invention.

FIG. 5a shows a portion of the address header in another embodiment of the present invention. A packet priority field, $P_s$, 501 is placed at the beginning of the address header 500 before the node fields 502. Although FIG. 5a shows $P_s$ placed at the beginning of the address header, it should be understood that the relative placement of $P_s$ may be anywhere in the address header under the condition that all nodes in the network agree and know where to look in the header for the packet priority field 501. In the embodiment shown in FIG. 5a, referred to as a strong priority method, all nodes receiving the packet use the packet priority field 501. Under the strong priority scheme, packets in higher priority classes are always assigned output ports before packets of lower priority classes irrespective of their deflection preferences.

Figure 5B:
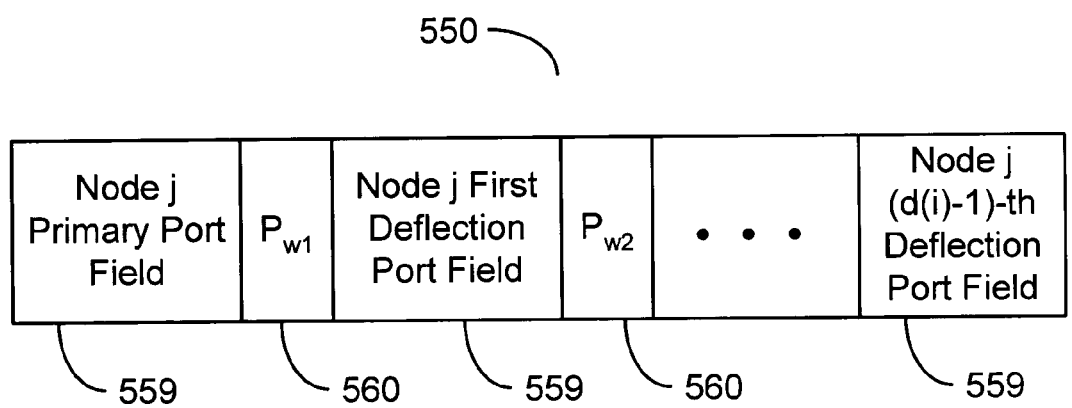
FIG. 5b is a schematic showing the sub-header structure in another embodiment of the present invention.

FIG. 5b shows the j-th node field of an address header embodying a weak priority scheme. In the embodiment shown in FIG. 5b, deflection preferences take precedence over the priority classes of the packets. The port priority fields are used to resolve output port contentions among packets in the same output port assignment round only. Packets of different priority classes are processed together at each output port assignment round. If two packets request the same output port at the same round, the packet with higher priority is assigned the output port. If a packet requests an output port that has already been assigned in an earlier round, even to a packet in a lower priority class, the output port remains unavailable to the packet.

The weak priority scheme may be implemented by adding a port priority field 560 at the end of the port field 559. It should be understood that as long as all nodes in the network agree and know where to look for the port priority field 560, the relative location in the address header is arbitrary.

Figure 6:
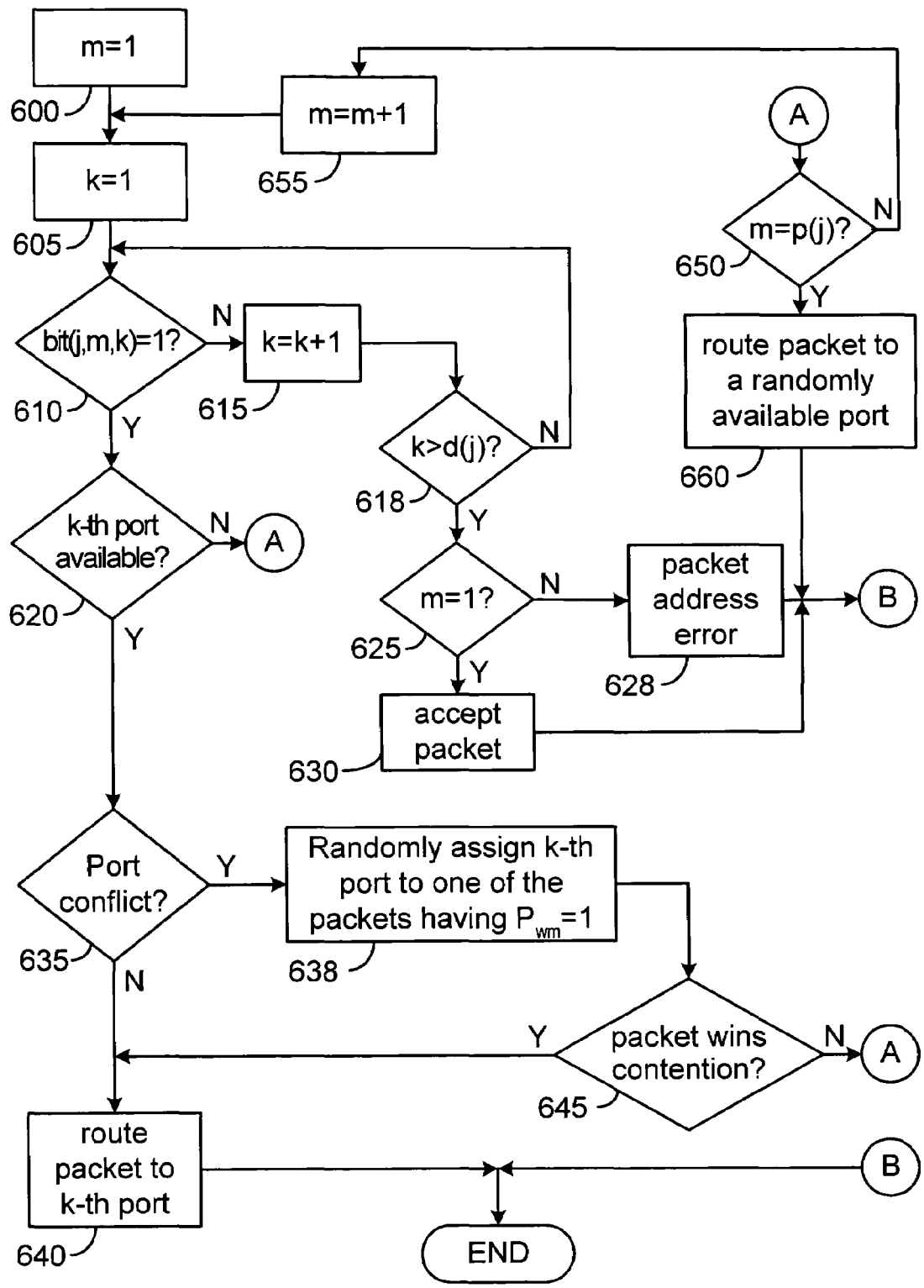
FIG. 6 is an illustrative flowchart outlining the steps in an exemplary method for routing a packet having a deflection routing address with enabling the weak priority feature in accordance with the invention at a node.

FIG. 6 is a block diagram of a method for routing a packet at a node according under a weak priority scheme. Referring to FIG. 6, the port field index variable, m, is initialized to 1 in 600 and the port index variable, k, is initialized to 1 in 605. Bit(j,m,k) of the incoming packet header is compared to 1 in 610, where j is the node receiving the incoming packet. If bit(j,m,k) is equal to 1, the node checks the availability of the k-th port in 620. If the k-th port is available, the node determines if there is a conflict in 635 and routes the packet to the k-th port if there is no conflict in step 640. If more than one packet requests the k-th port, a conflict is generated in 635 and control is transferred to step 638. In step 638, the node randomly selects from among the conflicting packets having the port priority field 560 set and forwards the selected packet to the k-th output port. If only one of the contending packets have their port priority field set, the node will forward the packet with the set port priority field through the k-th output port. If none of the contending packets have their port priority field 560 set or if all of the port priority fields are set, the node forwards one of the contending packets, selected randomly, through the k-th output port. Therefore, packets having their k-th port priority field set will have a higher chance of being routed to the k-th output port. The packet that wins the contention in 645 is routed to the k-th port. For the packet that loses the contention in 645, the port field index variable is compared to p(j) in 650. If the port field index variable is equal to p(j), the losing packet is routed to a randomly available port in 660 when p(j)<d(j). If the port field index variable is not equal to p(j), the port field index variable is incremented in 655 before returning to 605.

If bit(j,m,k) is not equal to a logical 1 in 610, the port index, k, is incremented in 615 and compared to d(j) in 618. If the port index is less than or equal to d(j), control is transferred to 610. If the port index is greater than d(j) in 618, the node determines if the port field is the primary port field in 625. If the port field is not the primary port field, the node determines that a packet address error has occurred in 628 and exits from the process. If the port field index is the primary port field 625, then all of the bits of the first port field is unset, indicating that node j is the destination node of the incoming packet and the node accepts the packet in 630 before exiting the process.

In some embodiments, a time-to-live field may be added to the address header. The time-to-live field enables the network to remove packets that wander in the network for a long time. In one embodiment, the nodes of the network are synchronized and time is divided into cyclically indexed frames. Each frame contains an equal number of packet time slots and each node keeps track of the current frame. The time-to-live field contains m bits where m is the number of frames and each bit identifies one frame. The originating node determines the number of frames, j, corresponding to a maximum time, that the packet can stay in the network. The originating node sets the i-th through (i+j)-th bits, where the i-th frame is the current frame, in the time-to-live field, unsets the other bits in the time-to-live field, and appends field to the address header. In a preferred embodiment, the time-to-live field is appended to the beginning of the address header.

When a node receives a packet, it checks the bit position in the time-to-live field corresponding to the current time index. If the bit position contains a 1, the node continues to process the address field corresponding to that node. If the bit position contains a 0, the node drops the packet.

Figure 7A:
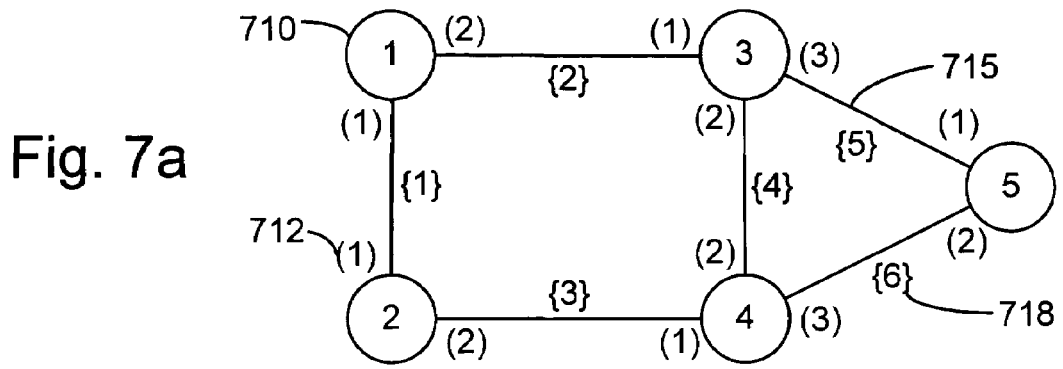
FIG. 7a is a schematic diagram of an exemplar network comprising five nodes and six links.

FIG. 7a-d is an illustrative example of one embodiment of address generation. FIG. 7a is a schematic diagram of an exemplar network comprising five nodes and six links. Each node 710 in the network communicates with another node via a link 715. The links may be unidirectional or, in a preferred embodiment, the links may be bidirectional. In a preferred embodiment, each node 710 is linked to at least two other nodes in the network. Each node 710 communicates to a link through an output port 712 that are arbitrarily numbered for each port and indicated by the number in parentheses in FIG. 7a. Each link 715 has an associated cost 718 indicated by the number in braces in FIG. 7a. Each node 710 in the network is assigned an ID, indicated by the number in the node 710.

FIG. 7b is a table showing the minimum routing costs between each pair of nodes shown in FIG. 7a. A node may be revisited to reduce the total routing cost of the packet. For example, the route from output port 2 of node 1 to node 2 is ①→③→①→② for a routing cost of 5. Each cell in the table represents the routing costs from a source node to a destination node. The number of entries in each cell equals the number of output ports in the source node. For example, the cell corresponding to the routes from node 1 to node 2, hereinafter referred to as the 1-2 cell, have two entries corresponding to the two output ports of node 1. The first entry in the 1-2 cell represents the cost of sending a packet from node 1 to node 2 when the packet is sent through port 1 of node 1. The second entry in the 1-2 cell represents the cost of sending a packet to node 2 when the packet is sent through port 2 of node 1.

FIG. 7c is a table showing the output port weights for each node shown in FIG. 7a. The port having the lowest cost is given a weight of 1, the port with the second lowest cost is given a weight of 2, and so on until all ports in the node are assigned a weight. In the example of the 1-2 cell, port 1 of node 1 is assigned a weight of 1 and port 2 of node 1 is assigned a weight of 2 because the cost, which in this example is 1, associated with port 1, 1, is less than the cost, 5, associated with port 2 of node 1.

FIG. 7d is a table showing the address header for each destination node shown in FIG. 7a according to one embodiment of the present invention. All packets having node 1 as its destination have the address header listed in the table in 7d for node 1. Node field boundaries, indicated by dashed lines, 754 and port field boundaries 752, indicated by dotted lines, are shown in the table of FIG. 7d as an aid to the reader and are not required for the operation of the present invention.

Continuing the example of FIG. 7, all packets having node 1 as its destination have the address header shown in the table of FIG. 7d for node 1. If a packet having a node 1 destination address header is received by node 1, node 1 processes the address header by locating its node field, which in this example is [00|00] where the square brackets represent the node field boundaries and the vertical line represents the port field boundary. Node 1 reads the primary port field, which in this example is 00. Node 1 accepts the packet because none of the bits in the primary port field is set (logical 1), which means that node 1 is the destination of the packet.

If a packet having a node 1 destination address header is received by node 2, node 2 processes the address header by locating its node field, which in this example is [10|01]. Node 2 reads the primary port field for node 2, which in this example is 10. Node 2 attempts to route the packet through its port 1 because the first bit, corresponding to node 2's output port 1, is set. If port 1 of node 2 is available, node 2 will forward the packet through port 1. If, however, port 1 of node 2 is unavailable, node 2 reads the first deflection preference port field, which in this example is 01 and attempts to route the packet through its port 2 because the second bit in the first deflection preference port field, corresponding to port 2 of node 2, is set.

Attached as Appendix A is a manuscript authored by the inventors entitled, "Deflection routing in slotted self-routing networks with arbitrary topology," presented at the IEEE International Conference on Communications held in New York, N.Y. between Apr. 28-May 2, 2002.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

Appendix A. Deflection routing in slotted self-routing networks with arbitrary topology Abstract—A deflection routing algorithm that can be applied to a novel self-routing; address scheme for networks with arbitrary topology is proposed. The proposed deflection routing algorithm can be implemented all-optically using bitwise optical logic gates. Besides the primary output link selection, alternate output link choices by a packet at each node in case of deflection are also encoded in the address header. Priority classes can also be defined in the proposed address scheme. The performance of the deflection routing algorithm is studied using the AT&T North America OC-48 optical fiber network topology.[*]

Introduction

The limited optical processing power and the lack of efficient buffers are the main obstacles in the realization of all-optical networks in which both the data and control signals remain in the optical domain from the source node to the destination node [1]. The current approach to optical networks is to keep the data in the optical domain and convert the control signal to the electrical domain for signal processing [2], [3]. In order to realize a packet-switched all-optical networking node, signal processing in the node must lie significantly reduced. Recently, we proposed a novel self-routing scheme that can be applied to networks with arbitrary topology [4]. The control signals can be processed using bitwise optical logic gates only.

In packet-switched networks, two or more packets may request the same output link in a node, resulting in a conflict. In store-and-forward routing, the node stores the conflicting packets temporarily in buffers so that all packets are optimally routed over the shortest path. Deflection routing allows one to avoid or reduce the use of buffers by intentionally routing the packets that lose in a conflict to the "wrong" output ports. The misrouted packets will find their way to their destination nodes but their arrival will be delayed. Deflection routing, in effect, uses the network links as temporary storage for the packets [5].

In this paper, we describe how deflection routing can be applied to the self-routing address scheme we proposed in [4] such that the scheme can still be implemented all-optically using demonstrated technology. In Section II, we give a brief review of the proposed self-routing scheme. Section III discusses how deflection routing can be implemented in the new address scheme. Section IV describes how other features such as priority classes can be implemented in the proposed address scheme. In Section V, we describe an all-optical implementation of the proposed deflection routing algorithm in a 2×2 all-optical deflection routing node using the all-optical crossbar switches demonstrated by Glesk et al. [6]. In Section VI, we study the performance of the deflection routing algorithm using the AT&T North America OC-48 optical fiber network topology as an example [7]. We draw the conclusion in Section VII.

Self-Routing Address Scheme

In the self-routing address scheme proposed in [4], the paths between any two nodes are fixed. The address of a node encodes a unique path from any other node to the node itself. The paths contained in each address must satisfy the following condition;

Condition 1: If the paths from two different nodes to the same destination node meet at an intermediate node, the subsequent links and nodes used by the two paths must be the same.

The basic self-routing addresses of the nodes in a network can be constructed as follows. We consider a network made up of N nodes and L links. All links are assumed to be bidirectional. Each node is arbitrarily labeled from 1 to N. The links connecting to each node are also arbitrarily labeled from 1 to n(i) where n(i) is the number of links connected to the i-th node. We have $\Sigma_{i=1}^{N}$ n(i)=2L.

The address of a node contains H bits, where H=2L. Each address is divided into N fields. Each field corresponds to one node in the network. The i-th field of an address contains n(i) bits. The i-th address field of node i is set to zero. For the j-th address field of node i, j≠i, one and only one of the n(j) bits, the x-th bit say, is set to 1. The other bits at the j-th address field are set to zeroes. A non-zero entry at the x-th bit of the j-th address field means that node j will forward a packet with such an address to the x-th output link.

When a node receives a packet, it only processes the address field corresponding to the node itself. A node recognizes that a packet has arrived at the destination if the corresponding address field is all zeroes. Otherwise it forwards the packet to the local output link as specified. In a node address, there is a total of (N-1) 1 bits out of the H bits. Bits in an address field are set to 1 depending on the paths defined.

Deflection Routing

In deflection routing, typically a node determines the optimal paths from itself to the destination nodes of the arriving packets. Packets requesting the same output ports are in conflict and they are prioritized according to a deflection criterion, for example age or distance-to-destination. The packets with higher priorities are routed optimally to the shortest paths while those with lower priorities are deflected to links that will lead to longer path lengths. Thus a node must have the capability to determine the optimal paths of arriving packets and compare the deflection criteria of conflicting packets. The information required to determine the optimal path and deflection criteria of a packet can be stored either in the nodes or in the packet header. The former approach requires all-optical memory in the node and the latter requires long address headers. While all-optical implementation of both approaches are in principle possible, neither of them is very practical.

In applying deflection routing to the proposed self-routing scheme for networks with arbitrary topology, it is important to simplify the signal processing requirement of the deflection algorithm as much as possible so that it can be implemented all-optically. Recall that the optimal link choice of a packet is already encoded in the proposed self-routing address header, therefore a node does not need to determine the optimal paths for the arriving packets. We do not require the node to determine the alternate link choices for a packet in the event of deflection. The alternate link choices are encoded in the address header of the packet instead. To further simplify the signal processing requirement, a node will not sort the packets in conflicts either. In case of conflicts in the first link choice, one of the conflicting packets is selected at random to use its preferred output link. The rest of the packets will try to use their respective second choices of output links. Further conflicts in the second choice of output links are resolved in the same way as that of the first choice. Successive choices of output ports can be arranged such that each gives the best alternative path, for example the next shortest path, when compared to the previous deflection choice. The delay due to deflections can therefore be minimized.

Alternate link choices of a packet can be implemented in the proposed self-routing addresses by adding deflection preference fields after each address field. The deflection preference fields have the same number of bits as the corresponding address field. Similar to the original address field, each bit position in the deflection preference fields is associated with an output port of the node. Each deflection preference field identifies an output port that is different from all the previous choices of output ports by the packet. For a node with k output ports, there can be at most k-1 deflection preference fields. The number of deflection preference fields used at each node need not be the same. FIG. 8 shows an example of the address field corresponding to node j in a network. Node j has three output ports which are labeled as shown in FIG. 8. Full deflection preferences are specified. The packet has output port 2 as its primary choice and output ports 1 and 3 as its first and second deflection preferences, respectively.

We assume that the network is slotted so that packets at all input ports arrive at each node simultaneously. We also assume that each node has the same number of input and output ports. A node assigns its output ports to the arriving packets in successive rounds in accordance to the order of the output port choices indicated in the packet's deflection preference fields. In the first round of output port assignment, the node considers the primary address fields of arriving packets. The node assigns the uncontended output ports to the packets requesting them. The node assigns each of the contended output ports to one of the contending packets at random. In the second round of output port assignment, the node processes the first deflection preference fields of all the packets that have not been assigned an output port in the first round. These are the packets that lose in their respective contentions. If the output port indicated at the first deflection preference field of a packet has already been assigned in the previous round, the packet will not be assigned an output port in this round. If more than one of the remaining packets request the same output port in their first deflection preference field, the contended output ports are assigned to one of the contending packets at random. The uncontended output ports are assigned to the packets requesting them.

If some packets have not been assigned an output port after the first two rounds, the node will start the third round of output port assignment by processing the second deflection preference fields of these packets. The procedure will be repeated until all the packets are assigned an output port or the deflection preference fields are exhausted. In the latter case, the packets that have not been assigned an output port will be assigned to the remaining available output ports randomly. This case occurs only when the number of deflection preference fields is less than k-1. Once all the packets are assigned a unique output port, the packets are routed accordingly.

The address length is given by $\Sigma_{i=1}^{N}$ n(i)² if full deflection preferences are given at each node. The address length will be rather long if the number of nodes or the number of out-put ports per node is large. Network simulations show that the improvement in network performance decreases rapidly when the number deflection preferences increases. Therefore, a small number of deflection preferences is sufficient in practice. For large networks, the address length can be further reduced with the use of hierarchical addresses [4].

Additional Features

Besides deflection preferences, additional features such as packet priority and time-to-live can be implemented in the proposed self-routing address scheme using bitwise optical logic gates. Priority classes are important in multimedia networks that mix delay-sensitive traffic and delay-insensitive traffic. To implement packet priority, we add a priority field which contains one or more priority bits to the address header. Depending on the relative importance between the deflection preferences of a packet and its priority class, one can define two types of packet priority schemes; strong priority scheme and weak priority scheme. In strong priority scheme, packets in higher priority classes are always assigned output ports before packets of lower priority classes irrespective of their deflection preferences. Strong priority scheme can be implemented by adding the priority field at the beginning of the address header. A node will sort its arriving packets according to their priority fields before it processes them class by class as described in Section III.

In weak priority scheme, deflection preferences will take precedence over the priority classes of the packets. The priority fields are used to resolve output port contentions among packets in the same output port assignment round only. Packets of different priority classes are processed together at each output port assignment round. If two packets request the same output port at the same round, the packet with higher priority will be assigned the output port. If a packet requests an output port that has already been assigned in an earlier round, even to a packet in a lower priority class, the output port will be unavailable to the packet. Weak priority scheme can be implemented by adding priority fields at the end of each deflection preference field. A node processes all the packets according to their primary and deflection link choices, irrespective of the priority class as described in Section 111. The node processes the priority fields only for those packets contending for the same output port.

All Optical Implementation

All-optical ultrafast switching with single bit all optical routing control in a banyan-type network has been demonstrated [6]. Two terahertz optical asymmetric demultiplexers (TOADs) [8], [9] are used in the construction of a 2×2 all-optical crossbar switch. The first TOAD acts as an ultrafast all-optical routing controller and the second TOAD acts as an ultrafast all-optically controlled routing switch. The all-optical crossbar switch in [6] can be used to construct a node that performs the proposed deflection routing algorithm. FIG. 9 shows a schematic of a possible implementation of a 2×2 deflection routing node. The deflection routing node is made up of four 2×2 all-optical crossbar switches (CS). The CSs and the output links of the node are labeled as shown in FIG. 9. One of the input ports of the crossbar switch serves as the control port and the other input serves as the signal port. The packet is transmitted to the signal port. If the address field corresponding to the node in the packet header matches the address in the control signal, the packet will exit the switch through the port marked "yes," otherwise, the packet will exit through the port marked "no." Recall that the address field corresponding to a node in the address header of a packet in effect contains the local address of the output link used by the packet at the node. The addresses of output links 1 and 2 are used as control signals for crossbar switches 1 and 2 respectively [10].

There are three possible scenarios in the operations of the node. First, only one packet arrives. Assume that the packet arrives at input link 1. If the address field of the packet corresponding to the node matches the address of output link 1, the packet will be routed to the "yes" port and then onto output link 1. The packet header is also used as the control signal for CS 3. Since no signal is input to CS 2, no packet exits CS 4. If the address field of the packet does not match the address of output link 1, the packet will be sent to the "no" port of CS 1 and enters the input signal port of CS 4. Since no signal comes from the control port of CS 4, the packet will exit through the "no" output port of CS 4 and then to output link 2.

The second scenario is when two packets arrive and they are intended for different output links. There is no contention and each packet will be routed to their intended output link as described above. Finally, contention occurs when two packets arrive simultaneously and both are intended for the same output link. For example, assume that packets A and B intended for output link 1 arrive at input links 1 and 2, respectively. Packet A exits the "yes" output port of CS 1 and continues to output link 1. Part of the header of packet A is also split off and used as control signal to CS 3. Packet B exits the "no" output port of CS 2 and enters the signal port of CS 3. Since the address field of packet B matches the address field of packet A which is used as the control signal in CS 3, packet B exits CS 3 at the "yes" port and exits the node through output link 2. In other words, packet B is "deflected" by packet A in CS 3.

In the implementation shown in FIG. 9, packets arriving at input link i have priority in the use of output link i, i=1, 2. We can remove the bias by interchanging the input packets to the two input links of the node randomly. k×k deflection routing nodes can be constructed in a similar way using the 2×2 crossbar switches. The complexity of the node architecture, however, will increase rapidly.

Network Simulations

In this Section, we study the performance of the proposed deflection routing algorithm. We consider a network based on the network topology of the AT&T North America OC-48 fiber network shown in FIG. 10. There are a total of 27 nodes and 37 links. The average number of output links per node is 2.8. We assumed that all links are bidirectional. The basic uncompressed self-routing address of a packet header is at least 74 bits long [4]. The shortest paths between the nodes are used in the construction of the self-routing addresses.

The maximum and minimum propagation delays between two nodes are estimated to be 0.75 ms and 16.5 ms, respectively. All other delays are rounded up to integral multiples of 0.75 ms. The delay between the nodes normalized by the minimum propagation delay are given in parentheses in FIG. 10. We also choose the minimum propagation delay between nodes as the slot size. At OC-48 (2.5 Gb/s), the slot length is 234 kbytes long. All simulation results are based on the observations of the arrivals of $2 \times 10^6$ new packets at each node. We assumed that at most one new packet arrives at a node per slot time. The probability that a new packet arrives at a node is the offered load. The load offered to each nodes is the same. We assume that a node sends the packets it receives uniformly to every node in the network except itself. In the simulations, on the average 7.7×10⁴ packets flow between a source-destination node pair for all offered load values that we studied.

Packets in transit have higher priority than newly arrived packets. A new packet will always be deflected by a transit packet if they contend for the same output port. A new arrival packet will be blocked if no output port is available. We studied three different implementations of the deflection routing algorithm in which zero, one, and the maximum number of deflection preference fields are used.

FIG. 11 shows the delay throughput curves for no deflection preference (squares), a single deflection preference (circles), and full deflection preferences (diamonds). The delay and the throughput values shown are delay and throughput values averaged over all nodes. The average propagation delay is about 16 ms. The maximum system throughput is about 33%. The system performance of the original address scheme, i.e., without deflection preference, improves if a single deflection preference field is added. However, there is much less performance improvement when the number of deflection preference fields is increased beyond one, indicating that most of the deflected packets are routed to the output ports of their first deflection preference. Therefore, the addition of a single deflection preference field should be sufficient in most cases.

The average deflection delay of a packet, i.e., the average additional delay due to deflections, as a function of offered load is shown in FIG. 12. At small offered load, the deflection delay in the no deflection preference case is larger than those when there are deflection preferences. When the offered load increases, the deflection delay for the no deflection preference case decreases while that for the single and full deflection preferences cases increase. When the offered load reached unity, all three cases give about the same deflection delay. The apparent difference in the behaviors of the average deflection delay curves is the result of local deflection hot spots which depend on the number of deflection preference fields defined and the offered load. Note that both the number of output ports and the delay caused by a deflection vary from node to node.

FIG. 13 shows the average delay versus the total offered load for both the strong priority scheme and the weak priority scheme. Full deflection preferences are used. There are two priority classes and the ratio of offered load for correspond to the packets of the higher priority class. From FIG. 13, the higher priority packets of the strong priority scheme have a shorter average delay than that of the weak priority scheme, but the lower priority packets of the strong priority scheme have a longer average delay than that of the weak priority scheme. The difference, however, is not very significant. Which priority scheme should be used in practice will therefore largely depend on the relative ease in implementation.

CONCLUSION

In conclusion, we proposed a deflection routing algorithm that can be implemented with the self-routing address scheme proposed in [4]. Alternate choices of output ports are encoded in the address header as additional deflection preference fields. If more than one packet contend for the same output port, one of the contending packets is selected to use its preferred output ports, other packets will attempt to use the output ports specified in their deflections preference fields. The deflection routing scheme can be implemented all-optically. We showed the schematic of a 2×2 all-optical deflection routing node based on the 2×2 all-optical crossbar switches demonstrated in [6]. We studied the performance of the proposed deflection routing algorithm using a network topology based on the AT&T North America OC-48 optical fiber network. The maximum throughput is about 33%. We found that the use of a single deflection preference field shows significant improvement in the network performance, as compared with that with no deflection preference. The use of a single deflection preference is sufficient in the example studied.

REFERENCES

[*] This research is supported in part by the Areas of Excellence Scheme established under the University Grants Committee of the Hong Kong Special Administrative Region, China (Project No. AoE/E-01/99). Additional support is provided by a grant from The Hong Kong Polytechnic University (Project Number A-PC68).

[1] V W. S. Chan, K. L. Hall, E. Modiano, and K. A. Rauschenbach, "Architectures and technologies for high-speed optical data networks," J. Lightwave Technol., Vol. 16, No. 12, pp. 2146-2168, 1998.

[2] C. Qiao and M. Yon, "Optical burst switching (OBS)—a new paradigm for an optical Internet," J. High Speed Networks, Vol. 8, pp. 69-84, 1999.

[3] M. Renaud, C. Janz, P. Gambini, and C. Guillemot, "Transparent optical packet switching: The European ACTS KEOPS project approach," in Proc. LEOS'99, Vol. 2, pp. 401-402, 1999.

[4] X. C. Yuan, V. O. K . Li, C. Y. Li and P. K. A Wai, "A novel self-routing scheme for all-optical packet switched networks with arbitrary topology," in Proce. ICC 2001, Vol. 7, pp. 2155-2159, Helsinki, Finland, 11-15 June 2001.

[5] A. S. Acampora, and S. I. A . Shah, "Multihop lightwave networks: A comparison of store-and-forward and hot-potato routing," IEEE Trans. on Comm., Vol. 40, No. 6, pp 1082-1090, 1992.

[6] I. Glesk, K. L. Kang, and P. R. Prucnal, "Demonstration of ultrafast alloptical packet routing," Electron. Lett., Vol. 33, No. 9, pp. 794, (1997)

[7] The network topology is obtained from the URL http://www.ipservices.att.com/backbone/bbone-map.cfm in March 2001.

[8] J. P. Sokoloff, P. R. Pruncal, I. Glesk, and M. Kane, "A Terahertz optical asymmetric demultiplexer," IEEE Photonic Tech. Left., Vol. 5, pp. 787-790, 1993.

[9] M. Eiselt, W. Pieper, and H. G. Weber, "SLALOM: Semiconductor laser amplifier-based processing nodes," J. Lightwave Technol., Vol. 13, pp. 2099-2112, 1995.

[10] I. Glesk, J. P. Solokoff, and P. R. Prucnal, "All-optical address recognition and self-routing in a 250 Gbit/s packet switched network," Electron. Lett., Vol. 30, No. 16, pp. 1322-1323, 1994.

What is claimed:

1. A method of routing a packet in an all-optical communications network, the network comprising at least one node, the node having at least two output ports, each port linking the node to another node in the network, the method comprising:

receiving the packet at a receiving node, the packet having an address header comprising at least one node field corresponding to the receiving node, the node field having a primary port field corresponding to one of the at least two output ports of the node and a first deflection port field corresponding to another of the at least two output ports of the node;

reading the node field corresponding to the receiving node;

routing the packet through the output port designated by the primary port field, if the output port is available; and routing the packet through the output port designated by the first deflection port field if the output port designated by the primary port field is unavailable.

2. The method of claim 1 further comprising generating an address header at a node, the address header including routing information for all nodes in the network and based on a destination node and a cost associated with each link in the network.

3. The method of claim 2 further comprising distributing the generated address header to another node in the network.

4. The method of claim 1 further comprising:
attaching the address header to the packet; and
routing the packet to an output port designated by the primary port field of the originating node field, if the output port designated by the primary port field is available.

5. The method of claim 1 further comprising accepting the packet if the primary port field of the node receiving the packet does not contain a set bit.

6. The method of claim 1 wherein the address header further includes a time-to-live field.

7. The method of claim 6 wherein the receiving node drops the packet based on the time-to-live field.

8. The method of claim 1 wherein the address header includes a packet priority field.

9. The method of claim 8 wherein a packet having a higher priority class determined from the packet priority field of the packet is routed through the output port of the receiving node before a packet having a lower priority class.

10. The method of claim 1 wherein the address header includes a port priority field.

11. The method of claim 10 wherein a first competing packet having a higher priority class determined from the port priority field of the first competing packet is routed through the output port associated with the port field before a second packet having a lower priority class.

12. An optical network node comprising:
a first output port;
at least one secondary output port;
means for reading an address header of an incoming packet, the address header comprising a node field associated with the optical network node, the node field comprising a primary port field and a first deflection port field;
means for forwarding the packet to the first output port if the primary port field designates the first output port; and
means for forwarding the packet to the at least one secondary port if the first deflection port field designates the at least one secondary output port and if the first output port designated by the primary output port is unavailable.

13. The optical network node of claim 12 further comprising:
means for generating an address header, the address header including routing information for all nodes on the network and based on a destination node and a cost associated with routing the packet;
means for attaching the address header to the packet; and
means for routing the packet to an output port designated by the primary port field of the originating node field, if the output port designated by the primary port field is available.

14. The optical network node of claim 12 further comprising means for accepting the packet if the primary port field of the node field corresponding to the optical network node does not contain a set bit.

* * * * *

UNITED STATES PATENT AND TRADEMARK OFFICE
CERTIFICATE OF CORRECTION

PATENT NO. : 7,433,597 B2  
APPLICATION NO. : 10/424829  
DATED : October 7, 2008  
INVENTOR(S) : Alex P. Wai et al.

Page 1 of 1

It is certified that error appears in the above-identified patent and that said Letters Patent is hereby corrected as shown below:

Title Page, Item (75) correct inventors names to read:  
\*\* Alex Pong-Kong Wai, Hong Kong (HK); Victor On-Kwok Li, Hong Kong (HK) \*\*

Signed and Sealed this

Twenty-fifth Day of November, 2008

JON W. DUDAS  
*Director of the United States Patent and Trademark Office*

UNITED STATES PATENT AND TRADEMARK OFFICE
CERTIFICATE OF CORRECTION

PATENT NO. : 7,433,597 B2
APPLICATION NO. : 10/424829
DATED : October 7, 2008
INVENTOR(S) : Alex P. Wai et al.

It is certified that error appears in the above-identified patent and that said Letters Patent is hereby corrected as shown below:

Title Page, Item (75) correct inventors names to read:
 Alex Ping-Kong Wai, Hong Kong (HK); Victor On-Kwok Li, Hong Kong (HK)

This certificate supersedes the Certificate of Correction issued November 25, 2008.

Signed and Sealed this

Seventh Day of April, 2009

JOHN DOLL
*Acting Director of the United States Patent and Trademark Office*